US008955616B2

(12) United States Patent
Östensson

(10) Patent No.: US 8,955,616 B2
(45) Date of Patent: Feb. 17, 2015

(54) PERCUSSION TOOL

(75) Inventor: Olof Östensson, Sigurd (SE)

(73) Assignee: Construction Tools PC AB, Kalmar (SE)

( * ) Notice: Subject to any disclaimer, the term of this patent is extended or adjusted under 35 U.S.C. 154(b) by 423 days.

(21) Appl. No.: 12/736,134

(22) PCT Filed: Mar. 31, 2009

(86) PCT No.: PCT/SE2009/000171

§ 371 (c)(1), (2), (4) Date: Sep. 13, 2010

(87) PCT Pub. No.: WO2009/123533

PCT Pub. Date: Oct. 8, 2009

(65) Prior Publication Data

US 2011/0005786 A1 Jan. 13, 2011

(30) Foreign Application Priority Data

Mar. 31, 2008 (SE) ........................................ 0800710

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***B25D 17/24*** | (2006.01) |
| ***B25D 17/06*** | (2006.01) |

(52) U.S. Cl.

CPC .............. *B25D 17/24* (2013.01); *B25D 11/005* (2013.01); *B25D 17/06* (2013.01); *B25D 2222/57* (2013.01); *B25D 2250/035* (2013.01); *B25D 2250/101* (2013.01); *B25D 2250/231* (2013.01)

USPC .............................................. 173/210; 173/19

(58) Field of Classification Search

USPC ......... 173/162.1–162.2, 210–211, 20; 91/309

See application file for complete search history.

(56) References Cited

U.S. PATENT DOCUMENTS

| | | | | |
|---|---|---|---|---|
| 3,568,909 A | | 3/1971 | Perkins | |
| 3,638,532 A | * | 2/1972 | Novak | 91/220 |
| 3,651,740 A | * | 3/1972 | Perkins | 91/417 A |
| 3,807,281 A | * | 4/1974 | Perkins | 91/418 |
| 3,895,562 A | * | 7/1975 | El Guindy | 91/308 |
| 4,149,513 A | * | 4/1979 | Gooden | 125/6 |

(Continued)

FOREIGN PATENT DOCUMENTS

| | | |
|---|---|---|
| GB | 399 773 | 10/1933 |
| GB | 1325940 | 8/1973 |

(Continued)

*Primary Examiner* — Robert Long

(74) *Attorney, Agent, or Firm* — Mark P. Stone

(57) ABSTRACT

A pneumatic percussion tool (1) for demolition and/or breaking work is connectable to an insert tool (2). The percussion tool has a percussion cylinder (4), a piston (5), arranged to travel in the bore of the cylinder (4), a buffer (8), and a valve unit (6), acting on the piston (5) during operation to produce a repetitive reciprocating motion in the bore of the cylinder (4) by alternately applying pressure to the upper or lower end of the cylinder (4) while the insert tool (2) is influenced by the stroke of the piston (5) at its dead center at the lower end of the cylinder (4). The percussion tool prevents the reciprocating motion of the piston when the buffer (8) reaches a predetermined degree of wear and the tool is not pressed against any object being worked.

22 Claims, 3 Drawing Sheets

(56) References Cited

U.S. PATENT DOCUMENTS

| | | | | |
|---|---|---|---|---|
| 4,188,858 | A * | 2/1980 | Plunkett | 91/392 |
| 4,441,644 | A * | 4/1984 | Farian | 227/130 |
| RE32,292 | E * | 11/1986 | Gooden | 125/6 |
| 5,099,926 | A * | 3/1992 | Fushiya et al. | 173/17 |
| 5,407,018 | A * | 4/1995 | Henry | 173/211 |
| 5,441,191 | A * | 8/1995 | Linden | 227/120 |
| 5,441,192 | A * | 8/1995 | Sugita et al. | 227/130 |
| 5,957,220 | A * | 9/1999 | Coffman et al. | 173/91 |
| 6,672,403 | B2 | 1/2004 | Ahr et al. | |
| 6,679,411 | B2 * | 1/2004 | Popovich et al. | 227/10 |
| 6,799,644 | B2 * | 10/2004 | Hoop et al. | 173/201 |
| 7,131,563 | B2 * | 11/2006 | Wen | 227/130 |
| 7,464,847 | B2 * | 12/2008 | Viola et al. | 227/175.2 |
| 7,810,692 | B2 * | 10/2010 | Hall et al. | 227/176.1 |
| 2002/0134562 | A1 | 9/2002 | Paul | |
| 2010/0019014 | A1 * | 1/2010 | Rodenhouse | 227/32 |
| 2010/0327040 | A1 * | 12/2010 | Aihara | 227/130 |

FOREIGN PATENT DOCUMENTS

| | | | |
|---|---|---|---|
| GB | 2084916 | | 4/1982 |
| GB | 2084917 | A | 4/1982 |
| GB | 2192824 | A | 1/1988 |
| JP | 2004130474 | A | 4/2004 |

* cited by examiner

PERCUSSION TOOL

TECHNICAL FIELD

The invention concerns a percussion tool driven by pressurised air for demolition and/or breaking work, for example in concrete, according to the present invention.

BACKGROUND

Percussion tools like the above can be used mainly for breaking up concrete and other demolition jobs, but also for example to remove rivets, whence the common English term "rivet buster" or rivet hammer. The percussion tool has an interchangeable insert tool and can be adapted to a number of different application fields by replacing the tool. The percussion tool comprises a buffer to absorb the impact energy that is not transmitted to the work site. The buffer wears down successively during use of the percussion tool and has to be replaced when it reaches a certain degree of wear. There is a risk that the operator will forget to replace the buffer and thereby risks causing internal damage to the percussion tool.

When working with percussion tools of this type, the operator presses the tip of the insert tool against the work site or the object being worked on. In this way, most of the impact energy generated in the percussion tool is transmitted to the work site. Under this type of normal use of the percussion tool, only slight wear will occur on the buffer. By far the greatest wear on the buffer occurs in cases when the operator leaves the percussion tool running, i.e., leaves the pressurised air to continue acting on the percussion tool, without the insert tool being in contact with the work site (in English, "backhammering"). This is a type of faulty use by the operator, who is instructed to avoid this.

The effect of the above-described pattern of use means that the buffer of the percussion tool is successively worn down and has to be replaced. The wear can have a rapid course, since the percussion tool will strike continually for as long as pressurised air is working on it. The striking frequency often lies in the range of 10 to 50 Hz. If the operator forgets to replace the buffer, this will result in costly damage to internal parts of the percussion tool and halting of operations.

With known percussion tools of this type it is difficult for the operator to know when it is time to replace the buffer. It is also quite possible for the operator to make the mistake of using the percussion tool in the above-described manner, even though the buffer is fully worn down or has reached an unacceptable degree of wear.

The percussion tool in British patent 2084916 is designed so that it can only be operated when the operator is pressing the tool against the work site. However, the solution is not applicable to pneumatic percussion tools of the above type with buffer, since the English percussion tool is electrically operated and lacks a buffer.

OBJECT OF THE INVENTION

The object of the present invention is to obtain a pneumatic percussion tool mainly for breaking up concrete and other demolition jobs for which the running stops automatically when the buffer reaches a predetermined degree of wear and when the operator is not pressing the tool against the work site. Another purpose is to achieve a visible indication to the operator that the predetermined degree of wear has been reached. The main benefit of the invention is to lessen the risk of damage to the percussion tool from forgetting to change the buffer.

BRIEF DESCRIPTION OF DRAWINGS

The invention will be described more closely by means of sample drawings.

DETAILED DESCRIPTION OF PREFERRED EMBODIMENTS

Figure 1:
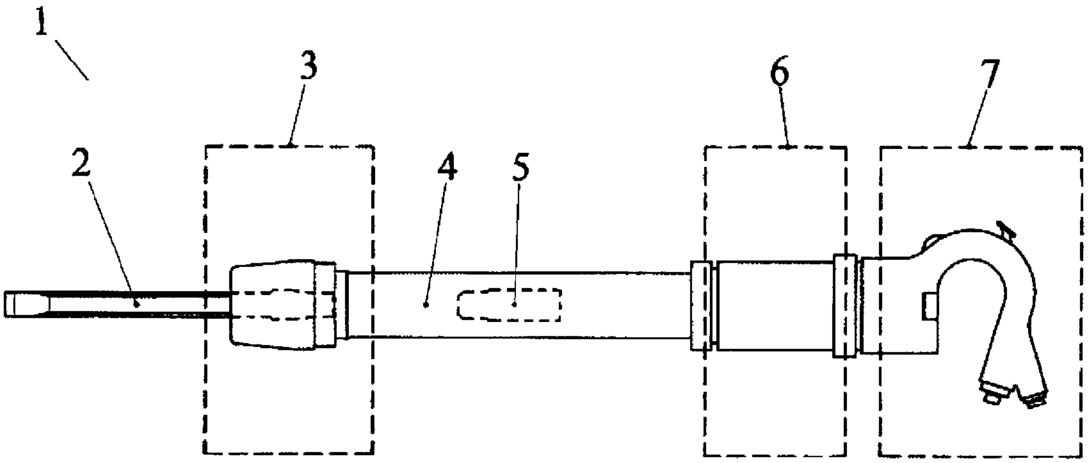
FIG. 1 shows the pneumatic percussion tool from the side.

FIG. 1 shows a pneumatic percussion tool 1, comprising an insert tool 2, a tool holder 3, a percussion cylinder 4, a piston 5, a valve unit 6 and a handle part 7. The upper end of the percussion cylinder 4 is connected to the valve unit 6 and its lower end to the tool holder 3 via a locking spring. It is also possible to use a threaded connection instead of a locking spring. The handle part 7 can be variously configured and comprises a handle, air controls, and connections for compressed air supply. When the operator works the air controls, pressurised air goes to the valve unit 6, which automatically and alternatingly applies pressure to the upper and lower end of the percussion cylinder 4. The alternating pressure makes the piston 5 move in reciprocation inside the percussion cylinder 4. This motion occurs repetitively for as long as pressurised air goes to the valve unit. The frequency is often in the range of 10-50 Hz, but even higher frequencies are conceivable. The piston 5 is thus subjected to a movement between the upper and lower part of the percussion cylinder 4. When the piston 5 is at its dead centre in the lower part of the percussion cylinder 4, it collides with the striking end of the insert tool 2 and its kinetic energy is transformed into impact energy as intended. The percussion tool 1 also comprises a buffer 8, a lower sleeve 9 and an up per sleeve 10 arranged inside the tool holder 3. The tool holder 3 is described at length in FIG. 2-7.

Figure 2:
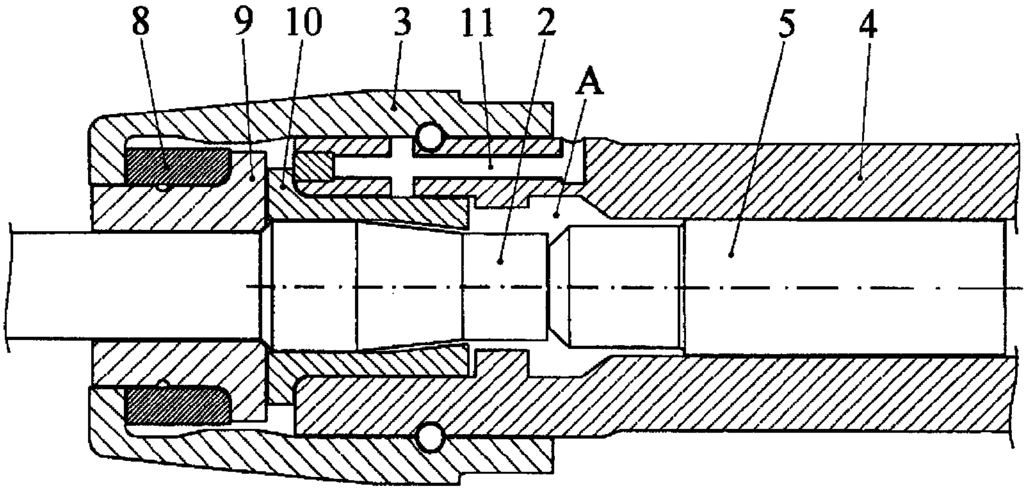
FIG. 2 shows a preferred embodiment of the percussion tool in an enlarged section of a tool holder and with intact buffer.

FIG. 2 shows the tool holder 3, the striking end of the insert tool 2, the percussion cylinder 4 and the piston 5 at the dead centre when the piston 5 has just collided with the striking end of the insert tool 2. The lower end A of the percussion cylinder 4 is still subjected to pressure via channels in the percussion cylinder 4 that are not shown in the figure. The pressure will afterwards result in pressing the piston 5 against the upper end of the percussion cylinder by the alternating pressurisation as described above in the context of FIG. 1. The tool holder 3 contains the buffer 8, the lower sleeve 9 and the upper sleeve 10. The buffer 8 is made of an elastic material and is shown in a condition not worn down. The lower sleeve 9 is arranged to lie against the buffer 8 and the upper sleeve 10 in turn is arranged to lie against the lower sleeve 9. In the lower end A of the percussion cylinder 4 is arranged a channel 11 to connect the lower end A of the percussion cylinder to the atmosphere. Due to the nonworn condition of the buffer 8 and the fact that the upper sleeve 10 is arranged to lie against the buffer 8 via the lower sleeve 9, the opening of the channel 11 is blocked by the upper sleeve 10. Thus the blocking makes it possible to apply pressure to the lower end A of the percussion cylinder 4.

Figure 3:
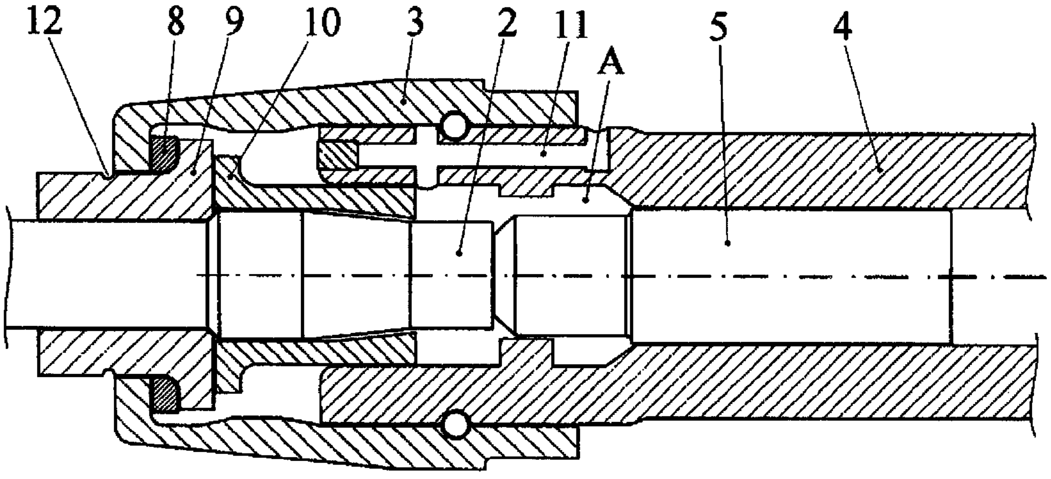
FIG. 3 shows the same as FIG. 2, but with buffer worn down.

FIG. 3 shows the piston 5 at the same dead centre as FIG. 2. The buffer 8 has become worn down by the previously described pattern of use of the percussion tool 1. The wear is a result of the impact energy generated being transmitted from the striking end of the tool 2 to the buffer 8 via the lower sleeve 9. The impact energy has caused a portion of the buffer 8 to break down and has reduced its height in the lengthways direction of the percussion tool 1. This, in turn, has made the lower 9 and upper 10 sleeve respond with a displacement in the lengthways direction of the percussion tool 1. The channel 11 is arranged to open as a result of the displacement of the upper sleeve 10 and a predetermined degree of wear on the buffer 8. The opening of the channel 11 prevents the applying of pressure to the lower end A of the percussion cylinder 4, in that the pressurised air is vented to the atmosphere via the channel 11. The predetermined degree of wear is defined by the inlet of the channel 11 being arranged to let it open, e.g., when the buffer 8 is 70-80% worn down. (The degree of wear is given relative to the original height of the buffer 8 in the lengthways direction of the percussion tool 1.) It is possible to allow a substantially higher degree of wear than indicated above by influencing the design and the choice of material for the buffer 8.

In this way, the running stops automatically when the buffer 8 has reached the predetermined degree of wear and if the operator is not pressing the tool against the work site.

When the predetermined degree of wear of the buffer 8 is reached, wear indicator 12 also becomes visible to the operator. The indicator 12 is formed as a groove in and around the lower sleeve 9 and it becomes visible when the sleeve 9 is moved out from the tool holder 3 due to the wear on the buffer 8. The indicator 12 can also consist of lettering, painting, a small decal or other type of marking. Thus, the operator is informed that the buffer is worn down and must be replaced.

Figure 4:
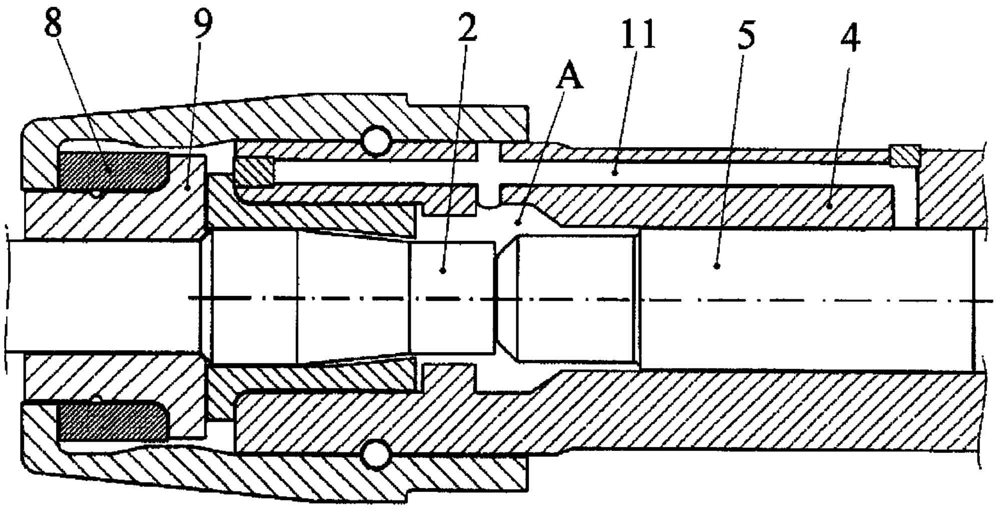
FIGS. 4 and 6, and 5 and 7, respectively show sections of alternative embodiments of the percussion tool with intact and worn buffers, respectively.

FIG. 4 shows a second sample embodiment of the percussion tool 1. The figure shows the same parts as FIG. 2 and in the same sequence when the piston 5 is at its dead centre. The details also have the same mutual relationship as described in FIG. 2 and result in the same displacement due to wear on the buffer 8. The rest of the description will deal with the differences from FIG. 2. The channel 11 in this sample embodiment is arranged to connect the lower end A of the percussion cylinder 4 to the bore of the percussion cylinder. As the buffer 8 is not worn down, and due to the striking end of the insert tool 2 being arranged to lie against the lower sleeve 9, the outlet of the channel 11 is blocked by the piston 5. Thus the blocking makes possible the applying of pressure to the lower end A of the percussion cylinder 4.

Figure 5:
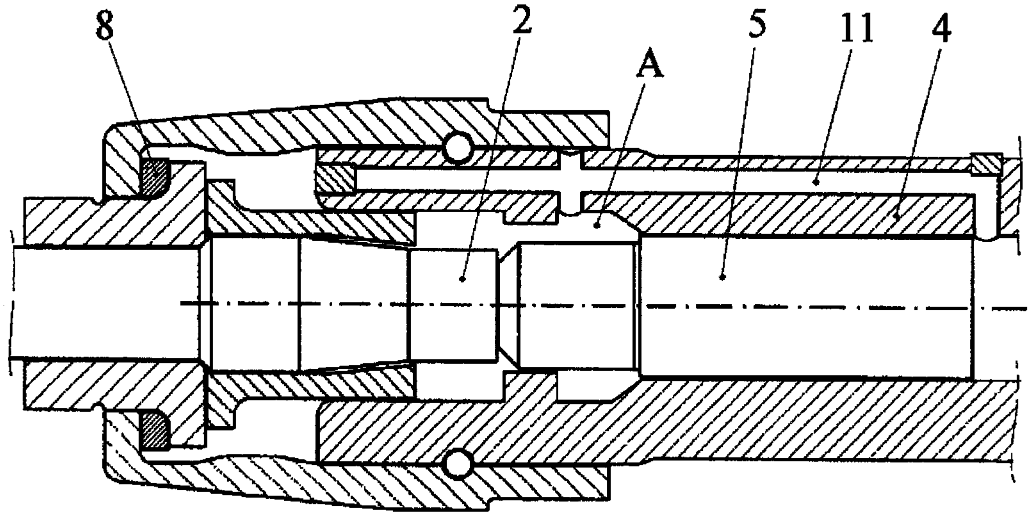

FIG. 5 shows the second sample embodiment from FIG. 4 in the same sequence where the parts have been caused to undergo displacement due to wear on the buffer 8. The wear has occurred by the process previously described in the context of FIG. 3. The wear has caused the insert tool 2 to become displaced, which in turn has brought about a corresponding displacement in the dead centre of the piston 5. The displacement of the piston 5 is utilised to open the outlet of the channel 11. Pressure is no longer applied to the lower end A of the percussion cylinder 4, since the pressurised air is vented to the bore of the cylinder via the channel 11.

In this way, the running stops automatically when the buffer has reached the predetermined degree of wear and if the operator is not pressing the tool against the work site. The predetermined degree of wear is defined in the way described for FIG. 3.

Figure 6:
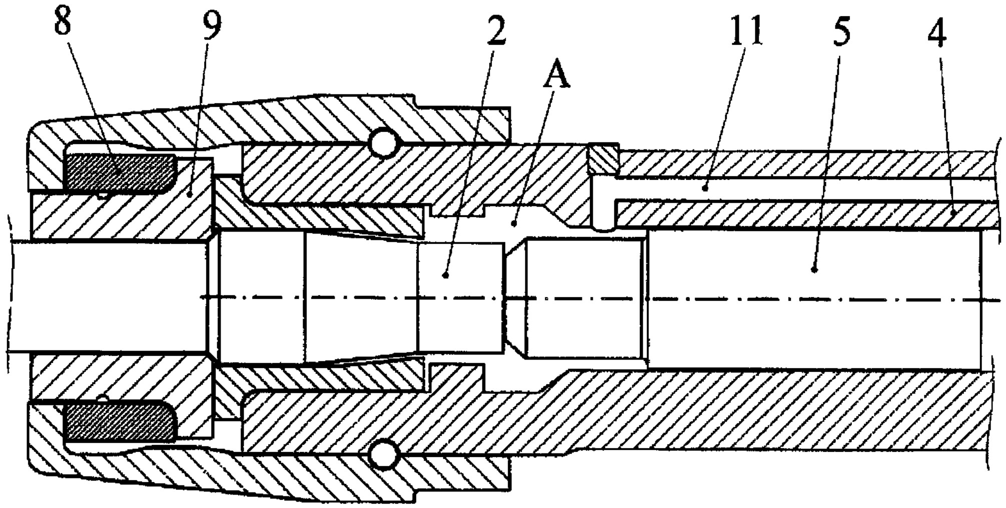

FIG. 6 shows a third sample embodiment of the percussion tool 1. The figure shows the same parts as FIG. 2 and at the same moment when the piston 5 is at its dead centre. The details also have the same mutual relationship as described in FIG. 2 and capable of the same displacement due to wear on the buffer 8. The rest of the description will deal with the differences from FIG. 2. The channel 11 in this sample embodiment is arranged to apply pressure to the lower end A of the percussion cylinder 4 during the alternating pressurisation process. As the buffer 8 is not worn, and due to the striking end of the insert tool 2 being arranged to lie against the lower sleeve 9, the piston 5 changes direction of movement in a position where it avoids blocking the outlet of the channel 11. The missing blocking thus makes it possible to apply pressure to the lower end A of the percussion cylinder 4.

Figure 7:
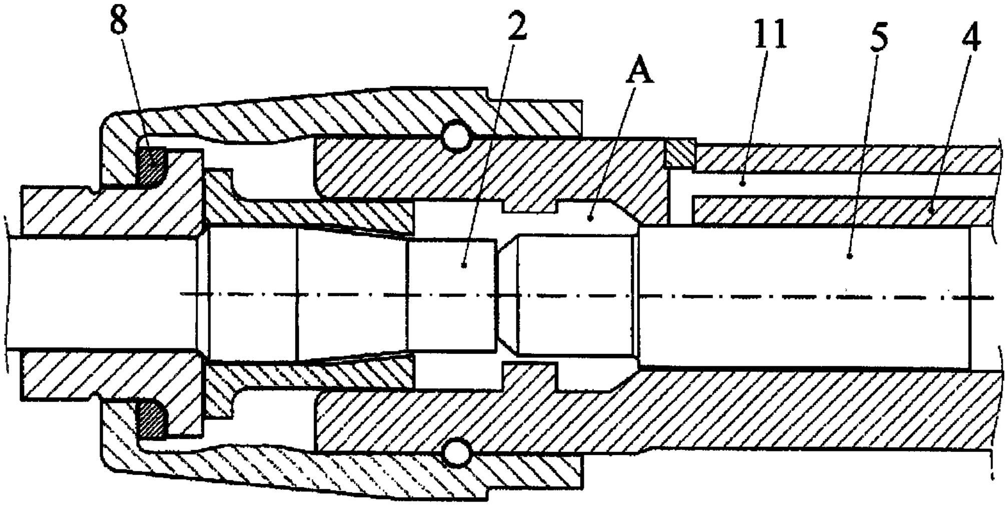

FIG. 7 shows the third sample embodiment from FIG. 6 at the same part of the sequence where the parts have been caused to undergo displacement due to wear on the buffer 8. The wear has occurred by the process previously described in the context of FIG. 3. The wear has caused the insert tool 2 to become displaced, which in turn has brought about a corresponding displacement in the dead centre of the piston 5. The displacement of the piston 5 is utilised to block the outlet of the channel 11 and prevent pressure from being applied to the lower end A of the percussion cylinder 4.

In this way, the running stops automatically when the buffer has reached the predetermined degree of wear and if the operator is not pressing the tool against the work site. The predetermined degree of wear is adjusted in the way described for FIG. 3.

In FIGS. 2-7, the percussion piston is always drawn in a position corresponding to no feeding force being applied against the object being worked. When the percussion tool is placed at and pressed against the object, both the insert tool 2 and the percussion piston 5 and the upper sleeve 10 will move upward, i.e., to the right in the figures. This causes the channel 11 to be closed and the tool can be used even with a buffer worn down, which is advantageous, for then a work procedure can be finished and the buffer can be changed under controlled conditions.

The upper sleeve is internally organised so that it follows the insert tool upward in the tool. In the sample drawing, this is indicated as a conical inner surface corresponding to an outer surface on the insert tool.

The above described embodiments are only samples of how the invention can be implemented. Thus, there can be several embodiments within the context of the formulated patent claims. For example, channel 11 in FIGS. 4 and 5 in the lower part of the cylinder's bore can emerge as in FIGS. 2 and 3, i.e., toward the upper sleeve with the buffer not worn down. In such a case, the right-hand opening can also be moved to the right in the figures, since the percussion piston no longer needs to act as an opening and closing element.

The invention claimed is:

1. A percussion tool driven by pressurized air for demolition or breaking work, and connectable to an insert tool via a tool holder, said percussion tool comprising a percussion cylinder, a piston arranged to travel in the bore of the percussion cylinder, and a valve unit which alternatingly during operation connects the upper or lower end of the percussion cylinder to a source of pressurized air, which is connectable to the percussion tool, thereby enabling a repeated reciprocating motion of the piston, wherein the insert tool connected to the percussion tool performs repeated striking motions under the action of the piston, said percussion tool being further arranged so that the axial striking position of the piston in the bore of the cylinder, which corresponds to the position of the piston where the energy of the piston is transmitted to the connected insert tool, is dependent on a feeding force by which the percussion tool, via the connected insert tool, is pressed against an object being worked, the percussion tool further comprising an elastic buffer arranged to, during operation, absorb the impact energy not transmitted to the object when the striking position of the piston is furthest downward, which corresponds to the position of the piston when the feeding force is at or below a predetermined value, wherein the percussion tool comprises means for automatically preventing the reciprocating motion of the piston at a predetermined degree of wear on the buffer when the feeding force is at or below said predetermined value, said percussion tool including means for selectively overriding said means for automatically preventing said reciprocating motion only after said reciprocating motion has stopped.

2. The percussion tool according to claim 1, wherein said means for automatically preventing the reciprocating motion comprises a channel which, when the buffer has reached a predetermined degree of wear, at least when the piston is in Its lower dead center, creates a connection between a first end of the cylinder bore and either the atmospheric pressure of the air surrounding the tool, or a second end of the cylinder bore, thereby preventing the alternating applying of pressure to the two ends of the piston.

3. The percussion tool according to claim 2, wherein the first end of the cylinder bore is the lower end.

4. The percussion tool according to claim 2, wherein the piston prevents the connection via the channel until the predetermined degree of wear on the buffer is reached and the piston is at its lower dead center and the feeding force is at or below said predetermined value.

5. The percussion tool according to claim 1, wherein the means for automatically preventing the reciprocating motion further comprises an upper sleeve, movably arranged in the cylinder bore and arranged to allow or prevent the reciprocating motion of the piston depending on its axial position.

6. The percussion tool according to claim 5, wherein the axial position of said upper sleeve during operation depends on the feeding force and, at or below said predetermined value, the degree of wear on the buffer.

7. The percussion tool according to claim 5, wherein the upper sleeve has inner surfaces causing it to move upward in the percussion tool when the insert tool is pressed against the object being worked.

8. The percussion tool according to claim 1, also comprising a lower sleeve lying against the buffer and responding to wear on the buffer with a displacement in the lengthways direction of the percussion tool, and an upper sleeve which lies against the lower sleeve and follows its displacement, wherein said means for automatically preventing the reciprocating motion comprises a channel, and the displacement of the upper sleeve is utilized for blocking or opening of the channel.

9. The percussion tool according to claim 1, wherein the means for automatically preventing the reciprocating motion furthermore is arranged to apply pressure to the lower end of the cylinder during the alternating applying of pressure to the ends of the cylinder.

10. The percussion tool according to claim 8, wherein the lower sleeve comprises a wear indicator, said wear indicator not visible to the operator as long as the buffer has not reached the predetermined degree of wear, and visible to the operator when the predetermined degree of wear of the buffer is reached.

11. The percussion tool according to claim 1, wherein said percussion tool is a rivet buster.

12. The percussion tool according to claim 6, wherein the upper sleeve has inner surfaces causing it to move upward in the percussion tool when the insert tool is pressed against the object being worked.

13. The percussion tool according to claim 9, said percussion tool comprising a lower sleeve lying against the buffer and responding to wear on the buffer with a displacement in the lengthways direction of the percussion tool, and an upper sleeve which lies against the lower sleeve and follows its displacement, and the displacement of the upper sleeve is utilized for blocking or opening of the means for automatically preventing the reciprocating motion, wherein the lower sleeve comprises a wear indicator, said wear indicator not visible to the operator as long as the buffer has not reached the predetermined degree of wear, and visible to the operator when the predetermined degree of wear of the buffer is reached.

14. The percussion tool according to claim 2, wherein the means for automatically preventing the reciprocating motion further comprises an upper sleeve, movably arranged in the cylinder bore and arranged to allow or prevent the reciprocating motion of the piston depending on its axial position.

15. The percussion tool according to claim 14, wherein the axial position of said upper sleeve during operation depends on the feeding force and, at or below said predetermined value, the degree of wear on the buffer.

16. The percussion tool according to claim 14, wherein the upper sleeve has inner surfaces causing it to move upward in the percussion tool when the insert tool is pressed against the object being worked.

17. The percussion tool according to claim 2, also comprising a lower sleeve, lying against the buffer and responding to wear on the buffer with a displacement in the lengthways direction of the percussion tool, and an upper sleeve which lies against the lower sleeve and follows its displacement, and the displacement of the upper sleeve is utilized for blocking or opening of the means for automatically preventing the reciprocating motion.

18. The percussion tool according to claim 2, wherein the means for automatically preventing the reciprocating motion furthermore is arranged to apply pressure to the lower end of the cylinder during the alternating applying of pressure to the ends of the cylinder.

19. The percussion tool according to claim 18, wherein the lower sleeve comprises a wear indicator, said wear indicator not visible to the operator as long as the buffer has not readied the predetermined degree of wear, and visible to the operator when the predetermined degree of wear of the buffer, is reached.

20. The percussion tool as claimed in claim 1, wherein said insert tool is a chisel.

21. The percussion tool according to claim 1, wherein said means for selectively overriding said means for automatically preventing said reciprocating motion comprise a channel arranged to permit application of a feeding force greater than zero after said predetermined degree of wear on said buffer has occurred.

22. The percussion tool according to claim 1, wherein said means for automatically preventing said reciprocating motion and said means for selectively overriding said means for automatically preventing said reciprocating motion comprises a single channel arranged to prevent reciprocating motion of said piston when said feeding force is at or below said predetermined value and said predetermined degree of wear on said buffer has occurred, and to permit movement of said piston after said predetermined degree of wear on said buffer has occurred by applying a feeding force that is greater than zero.

* * * * *

UNITED STATES PATENT AND TRADEMARK OFFICE

CERTIFICATE OF CORRECTION

PATENT NO. : 8,955,616 B2
APPLICATION NO. : 12/736134
DATED : February 17, 2015
INVENTOR(S) : Ostensson It is certified that error appears in the above-identified patent and that said Letters Patent is hereby corrected as shown below:

In the Claims,

Claim 2, Line 4 (Column 5, Line 15): Delete "Its", and substitute -- its --.

Claim 19, Line 3 (Column 6, Line 42): Delete "readied", and substitute -- reached --.

Signed and Sealed this
Twelfth Day of May, 2015

Michelle K. Lee
*Director of the United States Patent and Trademark Office*